Figure 1:
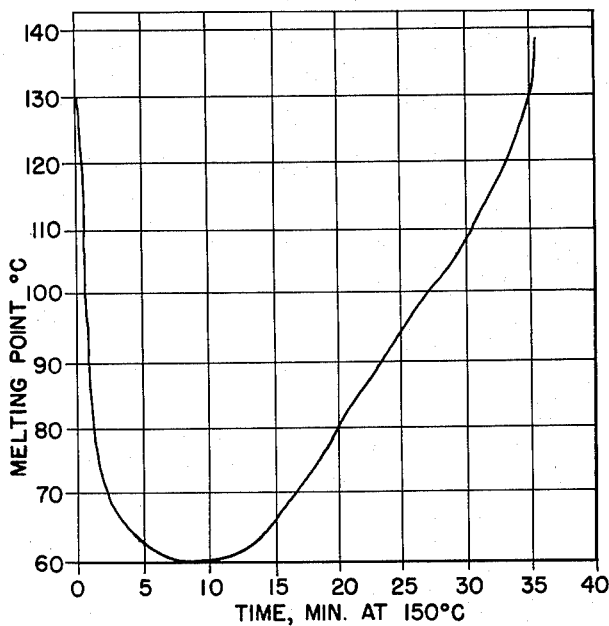

Dec. 21, 1965 D. E. PEERMAN 3,225,004
THERMOSETTING PLASTIC COMPOSITIONS DERIVED FROM POLYGLYCIDYL
ETHERS OF BIS(p-HYDROXYPHENYL) SULFONES AND CERTAIN
FATTY GUANAMINES AND PROCESS OF PREPARING SAME
Filed Dec. 1, 1964

INVENTOR.
DWIGHT E. PEERMAN

BY *Gene O. Enochson*

ATTORNEY

United States Patent Office 3,225,004
Patented Dec. 21, 1965

3,225,004
THERMOSETTING PLASTIC COMPOSITIONS DERIVED FROM POLYGLYCIDYL ETHERS OF BIS-(p-HYDROXYPHENYL) SULFONES AND CERTAIN FATTY GUANAMINES AND PROCESS OF PREPARING SAME
Dwight E. Peerman, 10201 Hillside Lane, Minneapolis, Minn.
Filed Dec. 1, 1964, Ser. No. 415,006
6 Claims. (Cl. 260—49)

The present invention relates to novel thermosetting plastic compositions derived from certain epoxy resins and fatty guanamines and the process of preparing said compositions. These compositions are reactive at elevated temperatures to produce cured resins possessing unusual properties.

The present application is a continuation-in-part of my prior application Serial No. 13,652, filed March 8, 1960, and now abandoned.

The compositions possess certain advantages over other epoxy resin compositions, but principally the advantage that the epoxy-guanamine composition is stable at room temperature for at least about one month and does not begin to cure until the tempertaure is raised above a certain threshold curing temperature. Accordingly, it is possible to prepare, in one package, a curable composition which can be a stable commodity of commerce. With most epoxy curing systems, it is necessary to maintain the epoxy resin and the curing agent separate until it is desired to effect reaction, since most epoxy curing systems are reactive at room temperature at least to some degree and react to produce cured resins when maintained at room temperature for extended periods of time. Moreover, it is now possible to cause the epoxy and guanamines to react partially to produce a "B" stage resin, a low molecular weight polymer which is thermoplastic and capable of rapid reaction at an elevated temperature to an insoluble infusible polymer. By "B" stage resin is meant a partially cured intermediate stage in which the two reactants are homogeneously compatible in a one component, stable, compound ready for final curing at elevated temperatures. The partially cured, curable composition which is stable at room temperature (i.e. about 25° C.) for extended periods can subsequently be molded by compression or transfer molding techniques to form thermoset molded articles of good thermal and physical properties.

It is therefore an object of this invention to provide a "B stage" resin, a partially cured composition which is stable at room temperature for extended periods of time.

It is a further object of the invention to provide a process of preparing a "B stage" resin which is stable at room temperature for extended periods of time.

The epoxy materials employed in the composition are those epoxy resins which are the reaction product of epichlorohydrin and bis (parahydroxyphenyl) sulfones. A typical epoxy resin of this reaction is a resin having the following theoretical structural formula,

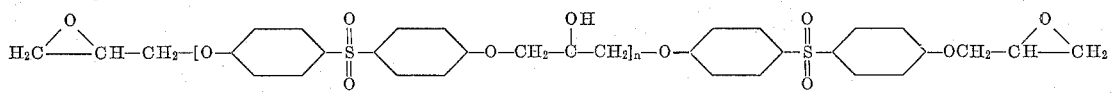

wherein $n$ is 0 or an integer up to about 10 and

is phenyl. Generally speaking $n$ will be no greater than 2 or 3 and is preferably one or less.

Epoxy resins may be characterized further by reference to their epoxy equivalent weight, the epoxy equivalent weight of pure epoxy resins being the mean molecular weight of the resin divided by the mean number of epoxy radicals per molecule, or in any case the number of grams of epoxy resin equivalent to one epoxy group or one gram equivalent of epoxide. Epoxy resinous materials employed in this invention have an epoxy equivalent weight of 180 to 2000 and preferably from 180 to 335. Especially preferred materials are those having an epoxy equivalent weight of 190 to 220.

A wide variety of guanamines may be employed in the present invention. They may be illustrated by the following formula,

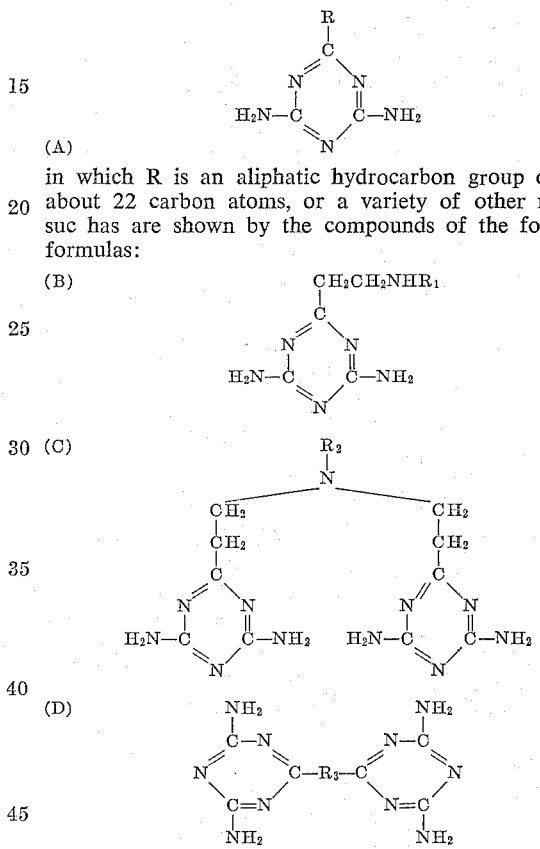

in which R is an aliphatic hydrocarbon group of 4 to about 22 carbon atoms, or a variety of other radicals suc has are shown by the compounds of the following formulas:

in which $R_1$ and $R_2$ are aliphatic hydrocarbon groups containing from 5 to 22 carbon atoms and in which $R_3$ is the divalent hydrocarbon group of dimerized unsaturated fatty acids.

These guanamines are conveniently made by well-known methods from dicyandiamide and nitriles. Thus the aliphatic substituted guanamines (A) may be made from aliphatic nitriles such as those derived from fatty acids. Compound (B) may be made from the nitrile $R_1NHCH_2CH_2CN$, which is the acrylonitrile adduct with the fatty amine $R_1NH_2$. Compound (C) may be made from the acrylonitrile diadduct of the fatty amine $R_2NH_2$,

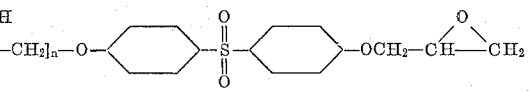

$R_2N(CH_2CH_2CN)_2$. Compound (D) may be made from the dinitrile prepared from dimerized fatty acids such as linoleic acid. Thus the fatty guanamines may be prepared from higher fatty acids containing from 5 to 22 carbon atoms by converting the fatty acids to the nitriles and then reacting the nitriles with dicyandiamide. The fatty acids employed may be a single isolated fatty acid or may be the mixed fatty acids from a fat or oil or any selected fraction of such fatty acids. Moreover the fatty acids may be either saturated or unsaturated. Fatty guanamines having the formula (A) above derived from the $C_8$ to $C_{18}$ acids of coconut oil are referred to as coco-guanamines.

It is difficult to characterize a "B stage" resin. It can generally be described as a partially cured composition which is stable for extended periods of time but is capable of being quickly cured at elevated temperatures. The epoxy-guanamine compositions may be described as proceeding through three stages, A, B and C.

The "A stage" is a simple blend or mixture of the epoxy resin and guanamine in which essentially no reaction has taken place. Such a simple blend or mixture willl be stable for great lengths of time.

The "B stage" is the same mixture which has been partially reacted or cured and is stable for extended periods of time. The "B stage" resin can be cured at elevated temperatures to yield the finally cured stage, the "C stage" which is an infusible and insoluble polymer.

The "A stage" mixture may of course be cured at elevated temperatures to provide an infusible, insoluble polymer. However, longer times for curing are required. Thus use of a "B stage" resin allows for rapid curing when required and still provides a stable starting material.

"B stage" resins are prepared by heating a mixture of the two constituents to effect partial curing and stopping such curing before the "C stage" is reached. This partial curing can be effected at various temperatures. At higher temperatures, the time of heating becomes short for producing the "B stage" resin and care must be taken that the time is not sufficiently extended so as to result in the "C stage." At lower temperatures, the heating period is slightly longer and control is easier. As a practical matter the epoxy-guanamines employed in this invention will generally be "B staged" at temperatures in the range of about 120 to 210° C. Temperatures outside this range may be used, however, although such may present some problems. For example, at higher temperatures the time of heating is so short that it is difficult to prevent advancement of the cure to the "C stage" or finally cured state. At lower temperatures the time of heating is so prolonged so as to be impractical or uneconomical. A temperature generally used in this invention is about 150° C., at which temperature the heating period is sufficiently long to allow for control over the reaction and yet is not an impractical or uneconomical length of time. At this temperature "B stage" resins may be prepared by heating for about 15 to 30 minutes.

As the temperature and period of heating will vary somewhat dependent on the particular epoxy resin, particular guanamine and the proportions thereof, some means of indicating when the "B stage" is reached is necessary. For the purpose of illustration, the following means of ascertaining when the B stage is reached will be described for a mixture of 87 parts by weight of an epoxy resin of bis (parahydroxyphenyl) sulfone and epichlorohydrin having an epoxy equivalent weight of 210 and 13 parts by weight of cocoguanamine having the formula (A) above and being derived from the mixture of $C_8$ to $C_{18}$ acids of coconut oil.

Basically there are three methods of determining when the "B" stage is reached, namely, compatibility, melting point, or by titration.

As to compatibility, this will be defined as a state of optical clarity although not necessarily colorless. Any opacity, translucency, or signs of striation would be considered incompatibility. Obviously, this would be a single phase system. If the two constituents in the proportions given above are heated separately to 150° C., and then blended with agitation for two minutes and allowed to cool to 30° C., they are incompatible as defined above and are characterized by being opaque. If, instead of immediately allowing them to cool to 30° C., the blend is maintained at 150° C. for 25 to 30 minutes, the opacity on cooling disappears and a clear amber resin results. Thus, it can be said that a "B stage" resin results when the blend has been interacted, with heat, to a point of where it is compatible.

As to melting point, the epoxy resin referred to above melts at 115° C. and the guanamine melts at 110° C. If these two are blended in the proportions given above at 150° C., with stirring, for two to three minutes and allowed to cool to room temperature, the melting point is 130° C., as can be seen from the graphical representation, FIG. 1 at 0 time. With longer periods of interactions at 150° C., the melting point declines until at about 10 minutes reaction time at 150° C., the resulting solid melts at 60° C. Thereafter, until gel formation takes place at about 35 minutes, any further reaction period at 150° C. results in an increased melting point. The results of this phenomenon can be seen from the graphical representation, FIG. 1. It could be said that the "B stage" has been achieved when after passing through the minimum of about 60° C., the melting point begins to rise and the resulting product is yet thermoplastic in nature. From the graphical representation the "B stage" portion of the curve could be said to be the straight portion after passing through the minimum. This would thus give a range of heating at 150° C. of about 15 to 35 minutes. As a practical matter, the heating would normally be carried on for 20 to 30 minutes. This period would ensure passing the minimum point and yet be below the point of gelation. As is apparent, a final cure of the "B stage" resin could be effected very rapidly. If the "B staging" were carried out only to the lower portion of the straight line after passing the minimum, the period for effecting final cure is of course prolonged.

It is understood that this graphical representation represents one specific epoxy resin and guanamine composition. However, it is a simple matter to prepare such a representation for other compositions and thus enable one to determine the point at which the "B stage" is reached.

Titration is another method which can be used for determining when the "B stage" resin is achieved. If the blend of epoxy-guanamine previously referred to is titrated with HBr in acetic acid and the results calculated as percentage of oxirane oxygen, a theoretical value of 7.36% is obtained. Since HBr titrates both oxirane oxygen and the amine, the amino groups in the fatty guanamine contribute, theoretically, 0.74% of the total 7.36% total, calculated as oxirane oxygen. The amine contribution should theoretically remain constant, so that any decrease in titration results, should be attributable to disappearance of oxirane oxygen. Typical values obtained from titration are as follows:

| | Percent |
|---|---|
| After 10 minutes at 150° C. | 5.36 |
| After 20 minutes at 150° C. | 3.33 |
| After 30 minutes at 150° C. | 2.98 |

Figure 2:
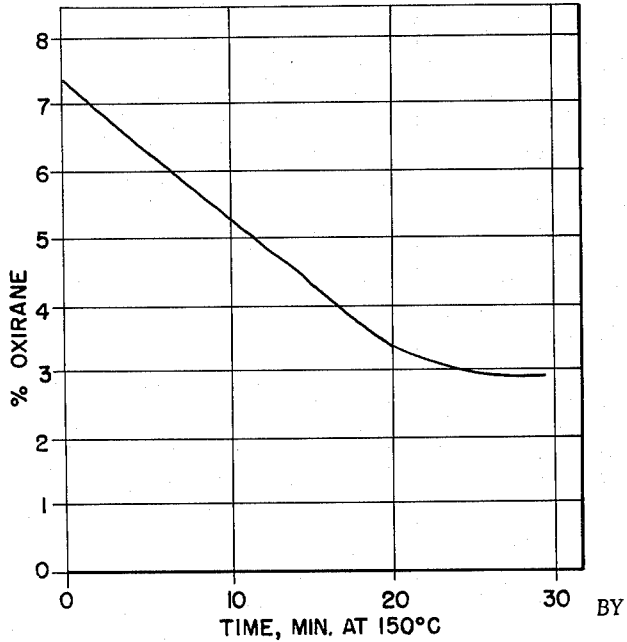

Plotting these values graphically as shown in FIG. 2, a change in slope appears just before the 20 minute figure. It is at this point that the "B stage" resin could be said to have been reached. After 30 minutes, gel formation occurs so rapidly that it is difficult to titrate the product which is, of course, becoming more and more insoluble. For practical purposes, it can be said that the B stage is reached when the percent oxirane levels off, in this instance at about 3.0% and before final gelation occurs. When taken in conjunction with the melting point data, it is apparent that for this particular system the B stage resin is achieved by heating at 150° C. for about 20 to 30 minutes.

As stated previously, this point will vary dependent on the materials, proportions thereof, the temperature and time. However, this point can be readily determined for any of these variables by means of the methods described and this invention is not to be limited to B stage resins produced at any particular temperature for any particular time period, but encompasses any partially cured composition of the two constituents which are stable for extended periods of time and are capable of being cured to a final, infusible, insoluble polymer. Generally the reaction is terminated when 10 to 90% complete, and preferably when 30 to 60% complete, to provide the B stage resins of the present invention.

The B stage compositions have a threshold curing temperature near 200° F. At temperatures below this the "B stage" resins are quite stable for extended periods of time, for example one to several months. When the temperature is raised to 300° F. the composition reacts quickly to yield unusual rigid structural material.

This property of epoxy-guanamine blends to remain unreacted at lower temperatures makes possible several useful areas for these compositions. There has been a continual search for long pot life for epoxy compositions with which to formulate molding compounds, adhesives, potting compounds and fiber glass laminates. With the present invention it is possible to make compositions containing the two constituents and have them remain uncured for long periods of time even at temperatures considerably warmer than room temperature. At the same time these compositions may be cured at temperatures around 300° F. to yield solid rigid plastic materials which are infusible and insoluble in organic solvents. The cured blend is hard, tough, impact resistant and has good adhesive properties.

EXAMPLE I 754 parts by weight of an epoxy resin derived from epichlorohydrin and bis (parahydroxyphenyl) sulfone having an epoxy equivalent weight of 210 were blended with 103 parts by weight of cocoguanamine derived from the mixture of $C_8$ to $C_{18}$ acids in coconut oil. These were blended at a temperature of 145° C. until thoroughly homogenous. To this blend was added 428 parts by weight of inert kaolin clay with 215 parts by weight of hammermilled glass fibers, $\frac{1}{32}$ of an inch long. The blend was then "B" staged in the oven at 300° F. for 38 minutes. At this point the material was at the point of solidification. Upon cooling to room temperature, a friable solid resulted.

This material, finely divided, was placed in conventional compression molding equipment and molded at 375° F. at a pressure of 10,000 p.s.i. for a period of 25 minutes. Upon removal from the mold, the specimens were hard and of uniform excellent appearance, having taken the shape of the mold exactly. The material had a tensile strength of 7,000 p.s.i., a flexural strength of 8,750 p.s.i. and a flexural modulus of 900,000 p.s.i. It had a 24 hour immersion-in-water weight gain of 0.3% at 73° F. The impact strength of the material on the falling ball impact test (Mil-I-16923B) was 0.44 lb. The specimen had a shrinkage of 0.8% from mold dimension at room temperature. The heat distortion temperature was 133° C.

EXAMPLE II

To 90 parts by weight of the epoxy resin used in Example I was added 10 parts of a guanamine derived from the $C_8$ to $C_{10}$ fraction of coconut oil acids, said guanamine having the formula (A) above. The blend was homogenized at 150° C. with stirring while 25 parts of iron oxide were added, together with 20 parts of ½″ chopped strand roving. The mixture was allowed to cool then "B" staged for 25 minutes at 300° F. Bars molded from this material had a heat distortion temperature of 145° C. and appeared to have excellent physical properties.

EXAMPLE III

To 85 parts by weight of the epoxy resin used in Example I was added 15 parts by weight of stearoguanamine. This blend was homogenized by stirring at 145° C. and 35 parts by weight of a silicate clay known as ASP 405 was added. After again homogenizing the material was poured out and allowed to cool. It was "B" staged at 300° F. for 240 minutes. This material was molded as before and resulted in a hard molded article of good appearance.

As will be seen from the examples the guanamines and the epoxy compositions may be used in various proportions. The ratio used in each example was that giving the highest heat distortion temperature by test. In general the guanamines are used in an amount sufficient to cure the epoxy resin to an insoluble, infusible polymer. Preferably the guanamines are used in the range of about 10 to 50% by weight based on the combined weight of the guanamine and epoxy resins. It is also apparent from the foregoing examples that the epoxy-guanamine composition is stable for extended periods of time and can be cured by an elevation of temperature to an infusible solid. The curable composition can be molded by compression or transfer molding techniques to form thermoset molded articles of good thermal and physical properties. The cured products have good water resistance and excellent resistance to elevated temperatures. As there is no volatile material evolved, well formed moldings can be prepared without "breathing" the press as is common with many thermosetting molding compounds. It is also apparent that cured products prepared from the B stage compositions of the present invention have high heat distortion temperatures.

A wide variety of fillers may be used with the epoxy-guanamine resin to modify the properties thereof. As illustrated by the examples, glass fibers, clays, asbestos, metallic powders and the like may be used. The fillers will generally be employed in an amount of from about 10 to 70% based on the combined weight of guanamine and epoxy resin.

While various modifications of the invention have been described, it is to be understood that the same is not limited thereto but may be varied within the scope of the following claims.

Now, therefore, I claim:

1. A partially cured composition, stable for extended periods of time at room temperature and capable of being cured at elevated temperatures to form an infusible and insoluble polymer, consisting essentially of a reaction product prepared by the process consisting of: (1) reacting, at a temperature in the range of about 120 to 210° C., a polyglycidyl ether of a bis (p-hydroxyphenyl) sulfone and a guanamine having the formula

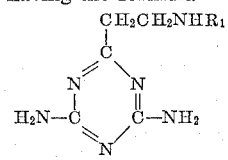

where $R_1$ is an aliphatic hydrocarbon group containing 5 to 22 carbon atoms, said guanamine being used in an amount sufficient to cure said polyglycidyl ether to an infusible and insoluble polymer; and (2) terminating the reaction by cooling when 10 to 90% complete.

2. A partially cured composition, stable for extended periods of time at room temperature and capable of being cured at elevated temperatures to form an infusible and insoluble polymer, consisting essentially of a reaction product prepared by the process consisting of: (1) reacting, at a temperature in the range of about 120 to 210° C., a polyglycidyl ether of a bis (p-hydroxyphenyl) sulfone and a guanamine having the formula

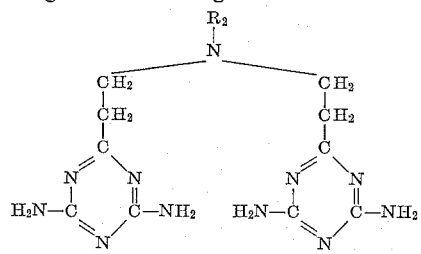

where $R_2$ is an aliphatic hydrocarbon group containing 5 to 22 carbon atoms, said guanamine being used in an amount sufficient to cure said polyglycidyl ether to an infusible and insoluble polymer; and (2) terminating the reaction by cooling when 10 to 90% complete.

3. A partially cured composition, stable for extended periods of time at room temperature and capable of being cured at elevated temperatures to form an infusible and insoluble polymer consisting essentially of a reaction product prepared by the process consisting of: (1) reacting, at a temperature in the range of about 120 to 210° C., a polyglycidyl ether of a bis (p-hydroxyphenyl) sulfone and a guanamine having the formula

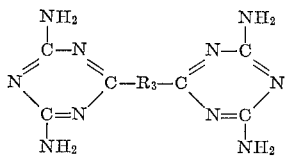

where $R_3$ is the divalent hydrocarbon group of dimerized unsaturated higher fatty acids, said guanamine being used in an amount sufficient to cure said polyglycidyl ether to an infusible and insoluble polymer; and (2) terminating the reaction by cooling when 10 to 90% complete.

4. A proces for preparing a partially cured composition stable for extended periods of time at room temperature consisting of: (1) reacting, at a temperature in the range of about 120 to 210° C., a polyglycidyl ether of a bis (p-hydroxyphenyl) sulfone and a guanamine having the formula

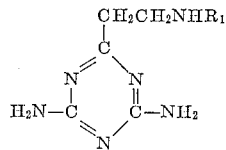

where $R_1$ is an aliphatic hydrocarbon group containing 5 to 22 carbon atoms, said guanamine being used in an amount sufficient to cure the said polyglycidyl ether to an infusible and insoluble polymer; and (2) terminating the reaction by cooling when 10 to 90% complete.

5. A process for preparing a partially cured composition stable for extended periods of time at room temperature consisting of: (1) reacting, at a temperature in the range of about 120 to 210° C., a polyglycidyl ether of a bis (p-hydroxyphenyl) sulfone and a guanamine having the formula

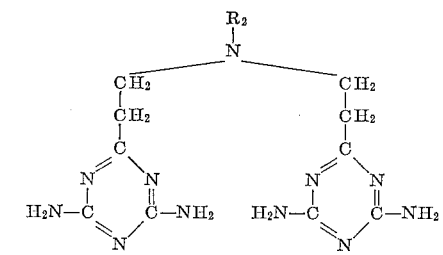

where $R_2$ is an aliphatic hydrocarbon group containing 5 to 22 carbon atoms, said guanamine being used in an amount sufficient to cure the said polyglycidyl ether to an infusible and insoluble polymer; and (2) terminating the reaction by cooling when 10 to 90% complete.

6. A process for preparing a partially cured composition stable for extended periods of time at room temperature consisting of: (1) reacting, at a temperature in the range of about 120 to 210° C., a polyglycidyl ether of a bis (p-hydroxyphenyl) sulfone and a guanamine having the formula

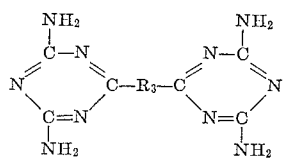

where $R_3$ is the divalent hydrocarbon group of dimerized unsaturated higher fatty acids, said guanamine being used in an amount sufficient to cure the said polyglycidyl ether to an infusible and insoluble polymer; and (2) terminating the reaction by cooling when 10 to 90% complete.

References Cited by the Examiner
UNITED STATES PATENTS

| | | | |
|---|---|---|---|
| 2,801,229 | 7/1957 | De Hoff | 260—47 |
| 2,928,811 | 3/1960 | Belanger | 260—47 |

FOREIGN PATENTS 629,111   9/1949   Great Britain.

OTHER REFERENCES

Lee et al.: Epoxy Resins, pp. 17–21 and 52, McGraw-Hill Book Co., Inc., New York, 1957.

WILLIAM H. SHORT, *Primary Examiner.*

LOUISE P. QUAST, *Examiner.*

J. C. MARTIN, *Assistant Examiner.*